(12) United States Patent
Glaesser et al.

(10) Patent No.: US 7,877,162 B2
(45) Date of Patent: Jan. 25, 2011

(54) METHOD AND APPARATUS FOR THE MANUFACTURE OF A SURFACE ON A GAS TURBINE BLADE

(75) Inventors: Arndt Glaesser, Dachau (DE); Stefan Heinrich, Adelshofen (DE)

(73) Assignee: MTU Aero Engines GmbH, Munich (DE)

( * ) Notice: Subject to any disclaimer, the term of this patent is extended or adjusted under 35 U.S.C. 154(b) by 522 days.

(21) Appl. No.: 10/589,528

(22) PCT Filed: Feb. 10, 2005

(86) PCT No.: PCT/DE2005/000222
§ 371 (c)(1),
(2), (4) Date: Dec. 8, 2008

(87) PCT Pub. No.: WO2005/080754
PCT Pub. Date: Sep. 1, 2005

(65) Prior Publication Data
US 2009/0088890 A1    Apr. 2, 2009

(30) Foreign Application Priority Data
Feb. 19, 2004   (DE) ........................ 10 2004 008 027

(51) Int. Cl.
G06F 19/00 (2006.01)
B23P 13/04 (2006.01)
B23P 19/00 (2006.01)

(52) U.S. Cl. .................... 700/160; 700/187; 700/190; 29/557; 29/889.7

(58) Field of Classification Search .............. 700/160, 700/172, 190; 409/183; 29/557, 889.7
See application file for complete search history.

(56) References Cited

U.S. PATENT DOCUMENTS

| 4,382,215 | A   | 5/1983 | Barlow et al. |
| 4,755,952 | A   | 7/1988 | Johns |
| 5,055,752 | A * | 10/1991 | Leistensnider et al. ...... 318/570 |
| 6,491,482 | B1 * | 12/2002 | Fenkl et al. .................. 409/132 |
| 6,542,843 | B1 * | 4/2003 | Metzinger et al. ........... 702/113 |
| 6,745,100 | B1 * | 6/2004 | Lermuzeaux ............... 700/187 |

(Continued)

FOREIGN PATENT DOCUMENTS

DE    199 22 012 C1    10/2000

(Continued)

*Primary Examiner*—Albert DeCady
*Assistant Examiner*—Sivalingam Sivanesan
(74) *Attorney, Agent, or Firm*—Crowell & Moring LLP

(57) ABSTRACT

A process and apparatus for the manufacture of adapted, fluidic surfaces on a gas turbine blade is disclosed. In an embodiment, the process includes: (a) generating a nominal milling program for the manufacture of fluidic surfaces in the region of one flow inlet edge and/or one flow outlet edge for an ideal gas turbine blade; (b) measuring the area of an actual gas turbine blade in the region of one flow inlet edge and/or one flow outlet edge thereof; (c) generating a milling program adapted to the actual gas turbine blade, where measured values determined in step (b) are used to adapt the nominal milling program generated in step (a) to the milling program for the actual gas turbine blade; and (d) manufacturing of the fluidic surfaces on the actual gas turbine blades by milling with the use of the milling program generated in step (c).

14 Claims, 1 Drawing Sheet

U.S. PATENT DOCUMENTS

| | | |
|---|---|---|
| 7,058,473 B2 * | 6/2006 | Muraki et al. ................ 700/190 |
| 7,520,055 B2 * | 4/2009 | Lundgren ................ 29/889.22 |
| 2001/0000805 A1 * | 5/2001 | Kadono ....................... 700/182 |
| 2002/0164221 A1 * | 11/2002 | Izutsu et al. ................ 409/132 |
| 2004/0024472 A1 * | 2/2004 | Evans et al. .................... 700/2 |

FOREIGN PATENT DOCUMENTS

EP  0 453 391 A2  10/1991

* cited by examiner

METHOD AND APPARATUS FOR THE MANUFACTURE OF A SURFACE ON A GAS TURBINE BLADE

This application claims the priority of International Application No. PCT/DE2005/000222, filed Feb. 10, 2005, and German Patent Document No. 10 2004 008 027.5, filed Feb. 19, 2004, the disclosures of which are expressly incorporated by reference herein.

BACKGROUND AND SUMMARY OF THE INVENTION

The invention relates to a process for the manufacture of adapted, fluidic surfaces.

Gas turbine blades, in particular those for aircraft engines, as a rule, are made as forged elements, in which case the gas turbine blades are provided with machining allowances in the region of their flow inlet edge as well as their flow outlet edge. If such gas turbine blades are to be used, for example, in the manufacture of an integrally bladed rotor, a so-called Blisk (Bladed Disk) or Bling (Bladed Ring), the gas turbine blades must be machined in the region of the flow inlet edge and flow outlet edge, before the blades are mounted to the rotor, in order to provide adapted, fluidic surfaces in the region of the flow inlet edge as well as the flow outlet edge.

Referring to prior art, the gas turbine blades are machined in order to manufacture adapted, fluidic surfaces in the region of the flow inlet edge as well as the flow outlet edge in that the gas turbine blades are milled in order to remove excess material and are subsequently manually round to ensure fluidic surfaces in the region of the flow inlet edge as well as the flow outlet edge. Manual rounding is time-consuming, expensive and cannot be reproduced. A manual rounding of gas turbine blades to provide adapted, fluidic surfaces in the region of the flow inlet edge as well as the flow outlet edge, therefore, represents an overall disadvantage.

German Patent Document DE 199 22 012 C1 relates to a process for the manufacture of adapted fluidic surfaces on integrally bladed rotors. The process described there is used after the gas turbine blades have been manually rounded in the region of their flow inlet edges as well as their flow outlet edges and joined to the rotor in a material-closed manner. The process in accordance with DE 199 22 012 C1 is used for machining gas turbine blades joined to the rotor in the region of the blade pans, i.e., in the region of a suction side, as well the pressure side thereof. However, this process is not used to manufacture fluidic surfaces in the region of the flow inlet edge and the flow outlet edge of gas turbine blades before the gas turbine blades are joined to a rotor in a material-closed manner.

Based on this, the object of the present invention is to provide a novel process for the manufacture of adapted, fluidic surfaces.

This object is achieved by means of a process for the manufacture of adapted, fluidic surfaces. In accordance with the invention, the process comprises at least the following steps: (a) generating a nominal milling program for the manufacture of fluidic surfaces in the region of one flow inlet edge and/or one flow outlet edge for an ideal gas turbine blade; (b) measuring the area of an actual gas turbine blade in the region of one flow inlet edge and/or one flow outlet edge thereof; (c) generating a milling program adapted to the actual gas turbine blade in order to manufacture fluidic surfaces in the region of the flow inlet edge and/or the flow outlet edge for the actual gas turbine blade, whereby measured values determined in step (b) are used to adapt or change the nominal milling program generated in step (a) to the milling program for the actual gas turbine blade; (d) manufacturing of the fluidic surfaces on the actual gas turbine blades in the region of the flow inlet edge and/or the flow outlet edge by milling with the use of the milling program generated in step (c), whereby, in a first partial step, coarse-milling, in particular roughing, is used to remove material in the region of the flow inlet edge and/or the flow outlet edge, and whereby, in an adjoining second partial step, fine-milling, in particular planing, is used to automatically round the flow inlet edge and/or the flow outlet edge.

Within the meaning of the present invention, a process is suggested with which gas turbine blades can be fully automatically machined in the region of their flow inlet edges as well as their flow outlet edges. Within the meaning of the present invention, the removal of material in the region of the flow inlet edge and flow outlet edge, as well as the rounding of the edges, is performed fully automatically by milling, so that the manual rounding required by prior art can be omitted. Consequently, time and costs for the manufacture of fluidic surfaces on gas turbine blades can be significantly reduced. Furthermore, reproducible manufacturing outcomes can be achieved.

In accordance with an advantageous development of the invention, the actual gas turbine blade is measured in such a manner that, in the region of the flow inlet edge and/or in the region of the flow outlet edge, respectively one series of measuring points is determined on a suction side and on a pressure side of the gas turbine blade, whereby each of these four series of measuring points consists of several measuring points distributed over the height and/or length of the flow inlet edge and/or the flow outlet edge. The series of measuring points determined on the suction side is used to change the nominal milling paths affecting the flow inlet edge and the flow outlet edge in the region of the suction side in such a manner that each nominal path point of these nominal milling paths having a corresponding measuring point is shifted by the value of deviation between the ideal gas turbine blade and the actual gas turbine blade in the region of the suction side. An interpolation is performed for the nominal path points of this nominal milling path for which such points no corresponding measuring point is available. The procedure is analogous for the pressure side. Likewise, an interpolation is performed for the nominal milling paths located between the nominal milling paths of the suction side and the nominal milling paths of the pressure side in order to adapt the paths to the actual gas turbine blade.

BRIEF DESCRIPTION OF THE DRAWINGS

Preferred developments of the invention are disclosed in the description hereinafter. Referring to a drawing, one exemplary embodiment of the invention will be explained, without, however, being restricted thereto. It shows.

DETAILED DESCRIPTION OF THE DRAWINGS

Figure 1:
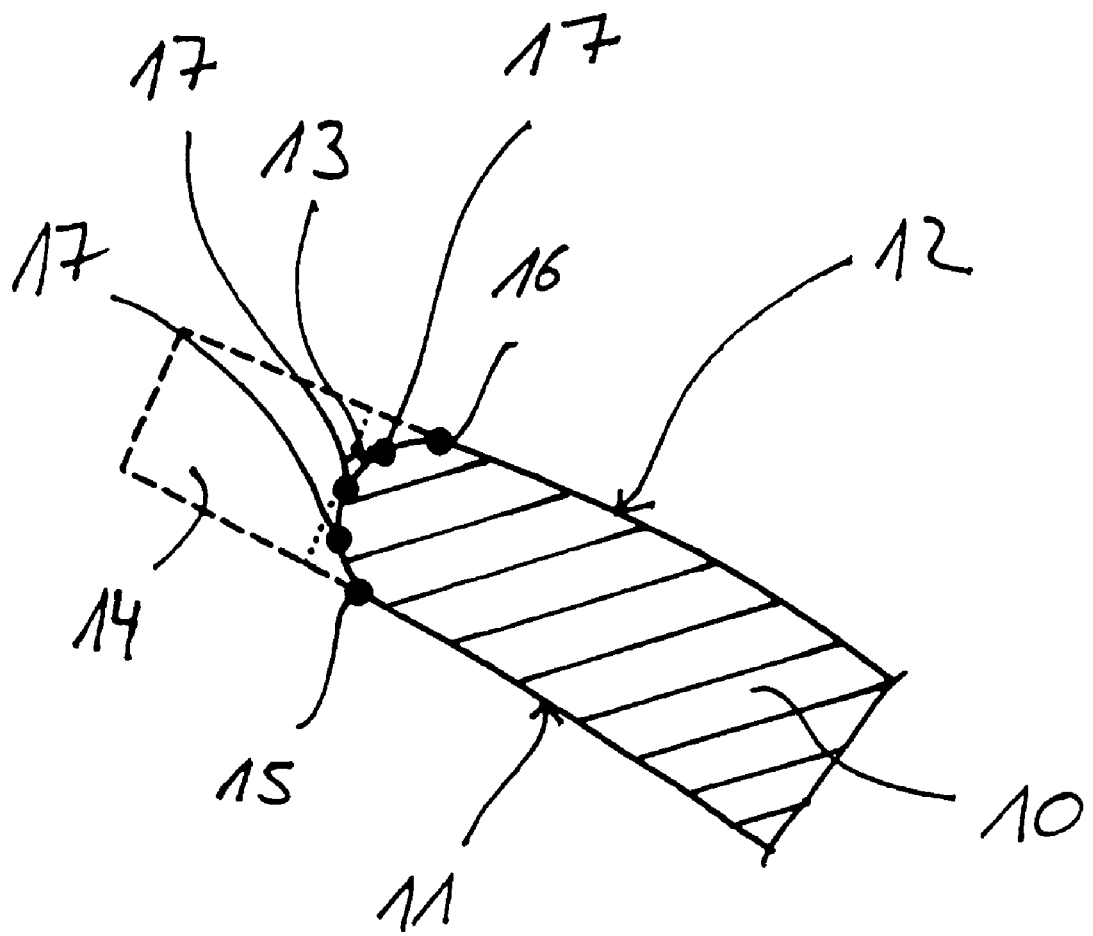
FIG. 1 is a sectional view of a schematic cross-sectional profile of a gas turbine blade in the region of the flow inlet edge of the gas turbine blade.

Referring to FIG. 1, the present invention will be explained in greater detail hereinafter.

FIG. 1 is a sectional view of a gas turbine blade 10, in cross-section. Thus, referring to FIG. 1, a pressure side 11 and a suction side 12 of the gas turbine blade 10, as well as a flow inlet edge 13 thereof, are shown, the inlet edge 13 providing a transition between the pressure side 11 and the suction side 12 of the gas turbine blades 10. A flow outlet edge, which also provides a transition between the pressure side 11 and the suction side 12 and is provided on the opposite end of the gas turbine blade 10, is not shown in FIG. 1.

As is illustrated in FIG. 1, the gas turbine blade 10, which has preferably been configured as a forged element, is provided—in unfinished state—with a machining allowance 14 in the region of the blade's flow inlet edge 13. It is now within the meaning of the present invention to suggest a process for the manufacture of adapted, fluidic surfaces on gas turbine blades in the region of their flow inlet edge as well as their flow outlet edge, whereby the process is used to automatically remove the machining allowance 14, on one hand, and, after removal of the machining allowance 14, this process is used to automatically round the gas turbine blade 10 in the region of the flow inlet edge as well as the flow outlet edge, in order to manufacture—in a fully automatic manner and without manual machining—adapted, fluidic surfaces in the region of the flow inlet edge as well as the flow outlet edge.

Within the meaning of the inventive process, a nominal milling program is generated for the manufacture of fluidic surfaces in the region of a flow inlet edge and a flow outlet edge for the gas turbine blade. The nominal milling program comprises, in the region of the flow inlet edge as well as in the region of the flow outlet edge, several nominal milling paths for the ideal gas turbine blade. Consequently, considering the region of the flow inlet edge as well as the region of the flow outlet edge, respectively one nominal milling path is located in the region of the suction side, respectively one nominal milling path is located in the region of the pressure side, and preferably—interposed between these two nominal milling paths—several nominal milling paths for the transition region between the suction side and the pressure side are provided. Each of these nominal milling paths for the ideal gas turbine blade comprises several nominal path points.

Now, in order to adapt this nominal milling program for the ideal gas turbine blade to a real gas turbine blade, an actual gas turbine blade to be machined in the region of the flow inlet edge and the flow outlet edge is measured during a second step. In so doing, the actual gas turbine blade is measured in that, in the region of the flow inlet edge as well as in the region of the flow outlet edge, i.e., on the suction side and on the pressure side of the gas turbine blade, respectively, a series of measuring points is determined. Consequently, a total of four series of measuring points are determined: a series of measuring points for the flow inlet edge in the region of the pressure side, a series of measuring points for the flow inlet edge in the region of the suction side, a series of measuring points for the flow outlet edge in the region of the pressure side and one additional series of measuring points for the flow outlet edge in the region of the suction side. Each of these four series of measuring points comprises a plurality of measuring points which are distributed over the height and/or length of the flow inlet edge and the flow outlet edge. The series of measuring points determined when measuring the actual gas turbine blade are used in a third step in order to adapt the nominal milling program to the actual gas turbine blade and thus determine a milling program for this gas turbine blade.

Therefore, after the actual gas turbine blades have been measured, a milling program adapted to the actual gas turbine blade is generated for the manufacture of fluidic surfaces in the region of the flow inlet edge and the flow outlet edge of the actual gas turbine blade, whereby the measured values or series of measured values determined when the actual gas turbine blade was measured are used to change the nominal milling program generated for the ideal gas turbine blade. To achieve this, the nominal milling program, on one hand, and the measured values determined when the actual gas turbine blade was measured, on the other hand, are computed together in such a manner that the result is a milling program for the actual gas turbine blade.

In order to simplify the illustration of the inventive process, it shall be assumed hereinafter that, in order to manufacture fluidic surfaces within the region of the flow inlet edge 13 of the actual gas turbine blade 10 as shown in FIG. 1, a milling program comprising a total of five milling paths is determined, namely a milling path 15 in the region of the pressure side 11, a milling path 16 in the region of the suction side 12, and a total of three milling paths 17 located between these two milling paths 15 and 16 for the transition between the pressure side 11 and the suction side 12. These five milling paths 15, 16, 17, as already shown above, are generated, on one hand, based on the corresponding nominal milling paths of the ideal gas turbine blade as well as on two series of measuring points which result from a measurement of the actual gas turbine blade on the flow inlet edge 13 in the region of the suction side 12 and of the pressure side 11.

In order to determine the milling path 15 in the region of the pressure side 11 of the actual gas turbine blade 10, within the meaning of the invention, the corresponding nominal milling path of the ideal gas turbine blade is computed with the series of measured points determined in the region of the flow inlet edge 13 on the pressure side 11. To accomplish this, a deviation between the ideal gas turbine blade and the actual gas turbine blade is determined for each available measuring point. Then, considering each nominal path point of the corresponding nominal milling path, for which such point a corresponding measuring point is available, the nominal path point is shifted by the value of the deviation between the ideal gas turbine blade and the actual gas turbine blade. Considering the nominal path points, for which no corresponding measuring point is available, an interpolation is performed, i.e., a spline interpolation, among the nominal path points for which corresponding measured values are available. Therefore, the milling path 15 for the flow inlet edge 13 in the region of the pressure side 11 is determined in this way.

A similar procedure is used to determine the milling path 16 in the region of the suction side 12. Also, considering this milling path 16, a corresponding nominal milling path is computed with the series of measuring points for the flow inlet edge 13 in the region of the suction side 12. In so doing, the series of measuring points of the flow inlet edge 13 determined in the region of the suction side 12 is used to change the respective nominal milling path in such a manner that each nominal path point of the respective nominal milling path, for which a corresponding measuring point is available, is shifted by the value of deviation between the ideal gas turbine blade and the actual gas turbine blade in the region of the suction side 12. Considering the nominal path points of the respective nominal milling path, for which no corresponding measuring point is available, again, a spline interpolation is performed. Therefore, the milling path 16 for the flow inlet edge 13 in the region of the suction side 12 is generated in this way.

As already mentioned above, a total of five milling paths 15, 16 and 17 is required for the manufacture of the flow inlet edge 13 in the exemplary embodiment of FIG. 1, whereby, however, considering milling paths 15 and 16, series of measuring points are only available in the region of the pressure side 11 or of the suction side 12. Considering the nominal milling paths affecting the transition region between the pressure side 11 and the suction side 12, no such series of measuring points are available. Therefore, in order to determine the milling paths 17 of the actual gas turbine blade, which are used to manufacture the surfaces in the transition region between the pressure side 11 and the suction side 12, interpolations are performed among series of measuring points in the region of the pressure side 11 and the suction side 12. These, too, are spline interpolations.

The milling paths for the actual gas turbine blade, which have been determined in the aforementioned manner based on the nominal milling paths of the ideal gas turbine blade and the series of measuring points of the actual gas turbine blade, form a milling program, in which case, with the use of this milling program in a fourth step, the fluidic surfaces on the actual gas turbine blade are manufactured.

In so doing, during a first partial step, the machining allowance 14 is removed by coarse-milling and, during a subsequent, second partial step, the flow inlet edge 13 is automatically rounded by fine-milling in order to provide the fluidic surface. Coarse-milling is also referred to as roughing; fine-milling is also referred to as planing. The above-described determination of milling paths for the actual gas turbine blade relates to milling paths for fine-milling, i.e., for the automatic rounding of the gas turbine blades in the region of the flow inlet edges as well as the flow outlet edges.

Following the above-described process for manufacture of the adapted, fluidic surfaces, the gas turbine blades can be joined to a rotor by linear friction welding. It is also possible, to subject the surfaces of the gas turbine blades to subsequent re-machining, for example, by chemically aided vibratory grinding.

The invention claimed is:

1. A process for manufacturing adapted, fluidic surfaces on gas turbine blades in a region of a flow inlet edge and/or a flow outlet edge of a gas turbine blade, comprising the steps of
   (a) generating a nominal milling program for manufacturing of fluidic surfaces in a region of a flow inlet edge and/or a flow outlet edge for an ideal gas turbine blade;
   (b) measuring an area of an actual gas turbine blade in a region of a flow inlet edge and/or a flow outlet edge thereof;
   (c) generating a milling program adapted to the actual gas turbine blade for manufacturing fluidic surfaces in the region of the flow inlet edge and/or the flow outlet edge for the actual gas turbine blade, wherein measured values determined in step (b) are used to adapt or change the nominal milling program generated in step (a) to the milling program for the actual gas turbine blade; and
   (d) manufacturing the fluidic surfaces on the actual gas turbine blade in the region of the flow inlet edge and/or the flow outlet edge by milling with the use of the milling program generated in step (c), wherein, in a first partial step, coarse-milling is used to remove material in the region of the flow inlet edge and/or the flow outlet edge, and wherein, in a second partial step, fine-milling is used to automatically round the flow inlet edge and/or the flow outlet edge,
   wherein the nominal milling program for the region of the flow inlet edge and/or the region of the flow outlet edge comprises several nominal milling paths including a first nominal milling path in a region of a suction side, a second nominal milling path in a region of a pressure side, and, interposed between the first and second nominal milling paths is a third nominal milling path for a transition region between the suction side and the pressure side, wherein each of the nominal milling paths comprises several nominal path points.

2. The process according to claim 1, wherein in step (b), the actual gas turbine blade is measured such that, in the region of the flow inlet edge and/or in the region of the flow outlet edge, respectively one series of measuring points is determined on the suction side and on the pressure side of the gas turbine blade, wherein each series of measuring points consists of several measuring points distributed over a height and/or a length of the flow inlet edge and/or the flow outlet edge.

3. The process according to claim 2, wherein in step (c), for each measuring point, a deviation between the ideal gas turbine blade and the actual gas turbine blade is determined, wherein these deviations are used to change the nominal milling program into the milling program for the actual gas turbine blade.

4. The process according to 2, wherein the, or each, series of measuring points determined in the region of the suction side is used to change the first nominal milling path in the region of the suction side in such a manner that each nominal path point of the first nominal milling path having a corresponding measuring point is shifted by a value of deviation between the ideal gas turbine blade and the actual gas turbine blade in the region of the suction side.

5. The process according to claim 2, wherein an interpolation is performed for a nominal path point of a respective nominal milling path for which no corresponding measuring point is available.

6. The process according to claim 5, wherein spline interpolations are performed.

7. The process according to claim 2, wherein the, or each, series of measuring points determined in the region of the pressure side is used to change the second nominal milling path in the region of the pressure side in such a manner that each nominal path point of the second nominal milling path having a corresponding measuring point is shifted by a value of deviation between the ideal gas turbine blade and the actual gas turbine blade in the region of the pressure side.

8. The process according to claim 1, wherein an interpolation is performed for the third nominal milling path located between the first nominal milling path of the suction side and the second nominal milling path of the pressure side in order to adapt the third nominal milling path to the actual gas turbine blade.

9. A method for manufacturing a fluidic surface on gas turbine blade in a region of a flow edge, comprising the steps of:
   generating a nominal milling program for manufacturing the fluidic surface in the region of the flow edge, wherein the nominal milling program includes a first nominal milling path in a region of a suction side, a second nominal milling path in a region of a pressure side, and a third nominal milling path for a transition region between the suction side and the pressure side, wherein each of the nominal milling paths include a nominal path point;
   measuring an area of the gas turbine blade in the region of the flow edge;
   generating an actual milling program for manufacturing the fluidic surface in the region of the flow edge by changing the nominal milling program based on the measured area; and
   manufacturing the fluidic surface in the region of the flow edge with the actual milling program, wherein in a first process step coarse-milling is used to remove material in the region of the flow edge, and wherein in a second process step fine-milling is used to round the flow edge.

10. The method according to claim 9, wherein the flow edge is a flow inlet edge.

11. The method according to claim 9, wherein the flow edge is a flow outlet edge.

12. An apparatus for generating a milling program for manufacturing a fluidic surface on gas turbine blade in a region of a flow edge, comprising:

a processor, wherein the processor generates a nominal milling program for manufacturing the fluidic surface in the region of the flow edge, wherein the nominal milling program includes a first nominal milling path in a region of a suction side, a second nominal milling path in a region of a pressure side, and a third nominal milling path for a transition region between the suction side and the pressure side, wherein each of the nominal milling paths include a nominal path point;

and wherein the processor generates an actual milling program for manufacturing the fluidic surface in the region of the flow edge by changing the nominal milling program based on a measured area of the gas turbine blade in the region of the flow edge.

13. The apparatus according to claim 12, wherein the flow edge is a flow inlet edge.

14. The apparatus according to claim 12, wherein the flow edge is a flow outlet edge.

* * * * *